United States Patent
Volz et al.

(10) Patent No.: US 9,567,010 B2
(45) Date of Patent: Feb. 14, 2017

(54) MOTOR VEHICLE BODY WHICH IS DESIGNED FOR A COLLISION WITH SMALL OVERLAP

(71) Applicant: Bayerische Motoren Werke Aktiengesellschaft, Munich (DE)

(72) Inventors: Karlheinz Volz, Inning am Ammersee (DE); Franz Hoiss, Bernried (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/715,888

(22) Filed: May 19, 2015

(65) Prior Publication Data

US 2015/0251702 A1 Sep. 10, 2015

Related U.S. Application Data

(63) Continuation of application No. PCT/EP2013/073551, filed on Nov. 12, 2013.

(30) Foreign Application Priority Data

Nov. 20, 2012 (DE) .......................... 10 2012 221 193

(51) Int. Cl.
*B62D 21/15* (2006.01)
*B60R 19/24* (2006.01)
(Continued)

(52) U.S. Cl.
CPC ............. *B62D 21/152* (2013.01); *B60R 19/03* (2013.01); *B60R 19/14* (2013.01); *B60R 19/18* (2013.01);
(Continued)

(58) Field of Classification Search
CPC ......... B60R 19/24; B60R 19/26; B62D 21/15; B62D 21/152; B62D 25/2081
(Continued)

(56) References Cited

U.S. PATENT DOCUMENTS 3,881,742 A * 5/1975 Felzer ..................... B60R 19/00
280/784
5,275,436 A 1/1994 Pomero
(Continued)

FOREIGN PATENT DOCUMENTS

DE 198 56 350 A1 6/2000
DE 100 00 032 A1 7/2001
(Continued)

OTHER PUBLICATIONS

English translation of DE 10 2011 004 105; retrieved on Nov. 30, 2015 from Espacenet using PatentTranslate.*
(Continued)

*Primary Examiner* — Jason S Daniels
(74) *Attorney, Agent, or Firm* — Crowell & Moring LLP (57) ABSTRACT

A motor vehicle body has a longitudinal beam and a bumper cross member, which is fixed to one end of the longitudinal beam. An end section of the bumper cross member protrudes over the longitudinal beam in the transverse direction. The end section of the bumper cross member is designed as a closed or open hollow profile element. A collision-resistant profile reinforcement is provided at least in some regions in the hollow profile element in the end section of the bumper cross member.

14 Claims, 4 Drawing Sheets

(51) Int. Cl.
  *B60R 19/14* (2006.01)
  *B60R 19/18* (2006.01)
  *B62D 25/08* (2006.01)
  *B60R 19/03* (2006.01)
  *B62D 25/20* (2006.01)

(52) U.S. Cl.
  CPC ............. *B60R 19/24* (2013.01); *B62D 25/082* (2013.01); *B62D 25/2081* (2013.01)

(58) Field of Classification Search
  USPC ..................... 296/187.03, 187.09, 187.1, 193.09, 296/203.02, 205; 293/132
  See application file for complete search history.

(56) References Cited

U.S. PATENT DOCUMENTS

| | | | |
|---|---|---|---|
| 8,322,780 B2 * | 12/2012 | Nagwanshi | B62D 29/005 296/187.03 |
| 2002/0163211 A1 | 11/2002 | Hagen | |
| 2005/0012317 A1 | 1/2005 | Taya et al. | |
| 2005/0088011 A1 | 4/2005 | Suzuki et al. | |
| 2009/0302591 A1 | 12/2009 | Auer et al. | |

FOREIGN PATENT DOCUMENTS

| | | | | |
|---|---|---|---|---|
| DE | 101 13 098 A1 | | 9/2002 | |
| DE | 101 21 354 A1 | | 11/2002 | |
| DE | 10 2004 051 571 A1 | | 6/2005 | |
| DE | 10 2009 036 254 A1 | | 3/2010 | |
| DE | 10 2008 057 881 A1 | | 5/2010 | |
| DE | 10 2009 053 866 A1 | | 5/2011 | |
| DE | 10 2010 031 089 A1 | | 1/2012 | |
| DE | 102011004105 A1 * | | 8/2012 | ........... B62D 21/152 |
| DE | 10 2011 078 029 B3 | | 10/2012 | |
| EP | 0 502 799 A1 | | 9/1992 | |
| EP | 1 612 126 A1 | | 1/2006 | |
| JP | 2000053022 A * | | 2/2000 | |
| WO | WO 2007/101285 A2 | | 9/2007 | |

OTHER PUBLICATIONS

English translation of JP 2000-053022; retreived Jun. 7, 2016 via PatentTranslate located at www.epo.org.*

International Search Report (PCT/ISA/210) dated May 21, 2014 with English translation (seven pages).

German Search Report dated May 7, 2013 with partial English translation (10 pages).

* cited by examiner

MOTOR VEHICLE BODY WHICH IS DESIGNED FOR A COLLISION WITH SMALL OVERLAP

CROSS REFERENCE TO RELATED APPLICATIONS

This application is a continuation of PCT International Application No. PCT/EP2013/073551, filed Nov. 12, 2013, which claims priority under 35 U.S.C. §119 from German Patent Application No. 10 2012 221 193.4, filed Nov. 20, 2012, the entire disclosures of which are herein expressly incorporated by reference.

This application contains subject matter related to U.S. application Ser. No. 14/715,868, entitled "Motor Vehicle Body Designed for a Collision with Small Overlap" filed on May 19, 2015.

BACKGROUND AND SUMMARY OF THE INVENTION

The present invention relates to a motor vehicle body for a motor vehicle, which is designed or optimized for a collision that has a small overlap with the vehicle.

Efforts have recently been made to increase the crash resistance of motor vehicle bodies for the event of a frontal collision with small overlap.

A deflector device for a partially overlapping frontal collision for motor vehicles is known from WO 2007/101285 A2, for example, wherein the deflector device is intended to cause the action of a transverse force on the motor vehicle body or on the vehicle during a collision. The deflector device is composed of an articulated beam construction, which in the event of a collision with small overlap with a collision partner, such as another motor vehicle, ensures that a wheel of the motor vehicle is advantageously pivoted in.

It is now the object of the present invention to create a motor vehicle body that is designed for a collision with small overlap, wherein the body is designed with simple measures such that a transverse force or transverse acceleration acts on the motor vehicle body in the event of a collision with small overlap.

This and other objects are achieved by a motor vehicle body according to the present invention having a longitudinal beam and a bumper cross member, which is fixed to one end of the longitudinal beam. An end section of the bumper cross member protrudes over the longitudinal beam in the transverse direction. The end section of the bumper cross member is designed as a closed or open hollow profile element. A collision-resistant profile reinforcement is provided at least in some regions in the hollow profile element in the end section of the bumper cross member.

"In some regions" in the present context shall be understood to mean that the profile reinforcement does not have to be provided in the entire end section of the bumper cross member. A collision-resistant profile reinforcement within the meaning of the invention withstands a frontal collision, in particular a frontal collision with small overlap. The profile reinforcement at least withstands a front collision up to a predetermined collision energy, or up to a predetermined load level, which is predefined by standardized crash tests, for example.

As a result of the collision-resistant profile reinforcement, which is in particular collision-resistant up to the predetermined collision energy, the end section of the bumper cross member is not compressed during the collision, in particular the frontal collision with small overlap, at least in the region in which the collision-resistant profile reinforcement is disposed or formed. The profile reinforcement is, in particular, not compressed in the collision direction. As a result, a width, which is to say in the driving direction of the motor vehicle body, of the end section of the bumper cross member is maintained, at least in the regions having the profile reinforcement. In other words, the cross-section of the end section of the bumper cross member is substantially maintained at least in the regions having the profile reinforcement. Because the cross-section of the end section of the bumper cross member remains substantially the same and is not compressed, the end section of the bumper cross member brings about a lateral momentum, which is to say a momentum in the transverse motor vehicle body direction, on the motor vehicle body in the event of the frontal collision with small overlap. The transverse momentum reduces an overlap of the collision partners, and therefore a collision energy in the longitudinal motor vehicle body direction.

The profile reinforcement is preferably designed in such a way that a deformation of the cross-section of the end section of the bumper cross member, in particular a compression of the cross-section of the end section of the bumper cross member in the collision direction, is limited or suppressed by the profile reinforcement in the event of a frontal collision, in particular a frontal collision with small overlap.

A "frontal collision with small overlap" within the meaning of the present invention is a frontal collision of the vehicle body with an obstacle. The obstacle can be a fixed, rigid obstacle, or a colliding party, i.e., another motor vehicle. The expression "small overlap" shall mean that the obstacle and the motor vehicle body, or the motor vehicle, do not collide centrally with each other, but collide offset from each other, in particular in such a way that the frontal collision takes place substantially in a region outside the longitudinal beam, which is to say on a side of the longitudinal beam on which a wheel mount is located. A frontal collision with small overlap may denote an overlap of the vehicle body with the obstacle in the transverse vehicle direction of approximately 25% or less.

Moreover, the profile reinforcement can be designed in such a way that it is not, or essentially is not, deformable as a result of the collision with small overlap.

The expression "not deformable" in this context shall be understood to mean the non-deformability under the forces that occur during the frontal collision with small overlap.

According to one aspect of the motor vehicle body, the end section of the bumper cross member is designed in such a way that it can bend or buckle in the event of the frontal collision. The end section of the bumper cross member having the profile reinforcement is designed in such a way that it is directly or indirectly supported on the longitudinal beam in the event of the frontal collision. In other words, the end section of the bumper cross member is bent or buckled to such an extent that the region of the end section of the bumper cross member is supported on the longitudinal beam itself, which is to say directly, or on an element disposed on the longitudinal beam, which is to say indirectly.

The profile reinforcement is particularly advantageous because it prevents the cross-section of the end section of the bumper cross member to be compressed, at least in the area where the profile reinforcement is provided, and therefore a larger transverse momentum acts on the motor vehicle body than if the cross-section were compressed.

In the case of the above-mentioned indirect support, a support element is preferably disposed on the longitudinal beam, wherein the support element protrudes into a space between a wheel mount and the end section of the bumper cross member, and wherein the support element and the end section of the bumper cross member are disposed so as to cooperate with each other such that the end section of the bumper cross member impacts the support element in a frontal collision.

The support element has the advantage that it further intensifies the transverse momentum on the motor vehicle body.

The support element is preferably a cantilever beam. The end section of the bumper cross member deformed by the frontal collision strikes the cantilever beam in the process. The deformed end section of the bumper cross member can particularly advantageously be supported at the end face of the cantilever beam, so that further deformation of the end section of the bumper cross member is prevented.

These features additionally increase the advantageous transverse momentum already mentioned above on the motor vehicle body.

The profile reinforcement is preferably only disposed in the region of the end section of the bumper cross member that strikes the longitudinal beam or the support element in the event of the frontal collision with small overlap.

In this way, the profile reinforcement is provided only in the regions that are particularly effective with respect to the above-described transverse momentum. This saves both material and weight, while achieving a similar effect.

As was already mentioned above, the end section of the bumper cross member and the longitudinal beam (in the case of direct support), or the support element (in the case of indirect support), cooperate with each other during the frontal collision such that a transverse force or a transverse momentum acts on the motor vehicle body.

The transverse force causes the collision partners to be pushed away from each other in the lateral direction, which is to say transversely to the collision direction, whereby the collision energy is reduced.

Advantageously, the cantilever beam, the longitudinal beam and the bumper cross member are located substantially in one plane in the motor vehicle body. This plane is preferably located parallel to the longitudinal axis and the transverse axis of the motor vehicle or of the motor vehicle body.

According to one aspect of the motor vehicle body, the bumper cross member, the longitudinal beam and/or the support element can be made of an aluminum material.

The present invention is overall suitable for bodies allowing for a lightweight construction with lightweight materials and high safety during collisions with small overlap.

A support beam is preferably provided on the motor vehicle body on a side of the wheel mount facing away from the end section of the bumper cross member. The support beam is designed in such a way that a load of the frontal collision transmitted via a wheel can be absorbed by the support beam. The support beam is, in particular, designed in such a way that it supports a movement of the wheel in the transverse direction during the frontal collision.

According to the above-described feature, the wheel can be supported on the support beam during a frontal collision, and additionally the special design of the support beam allows the wheel to be pivoted to the outside, so that it cannot penetrate the vehicle body in the direction of a passenger compartment.

The support beam preferably has a chamfered sliding surface for the wheel, which is designed such that the wheel can slide off in an outward direction. The support beam is preferably fixed to the longitudinal beam.

The support beam can also be fixed to another longitudinal beam, such as a central longitudinal beam.

According to one aspect of the motor vehicle body having the support beam, the support beam is provided with a car jack receiving element.

The profile reinforcement is preferably made of a foamed or non-foamed plastic material.

As an alternative or in addition, the profile reinforcement can be formed of a metallic extruded profile element, the extrusion direction of which forms a main load direction of the collision with small overlap.

In this way, the profile reinforcement can have as light as possible a design, yet offer sufficient strength and non-deformability. For example, a wall thickness of the profile element of the bumper cross member can be selected to be thinner due to the presence of the profile reinforcement, while maintaining strength, so that the bumper cross member is lighter.

The above-described refinements of the present invention can be combined with each other to the extent possible.

Other objects, advantages and novel features of the present invention will become apparent from the following detailed description of one or more preferred embodiments when considered in conjunction with the accompanying drawings.

DETAILED DESCRIPTION OF THE DRAWINGS

Exemplary embodiments of the present invention are described hereafter in detail with reference to the figures.

A detailed description of a first exemplary embodiment of the present invention is provided first with reference to FIGS. 1 to 5.

Figure 1:
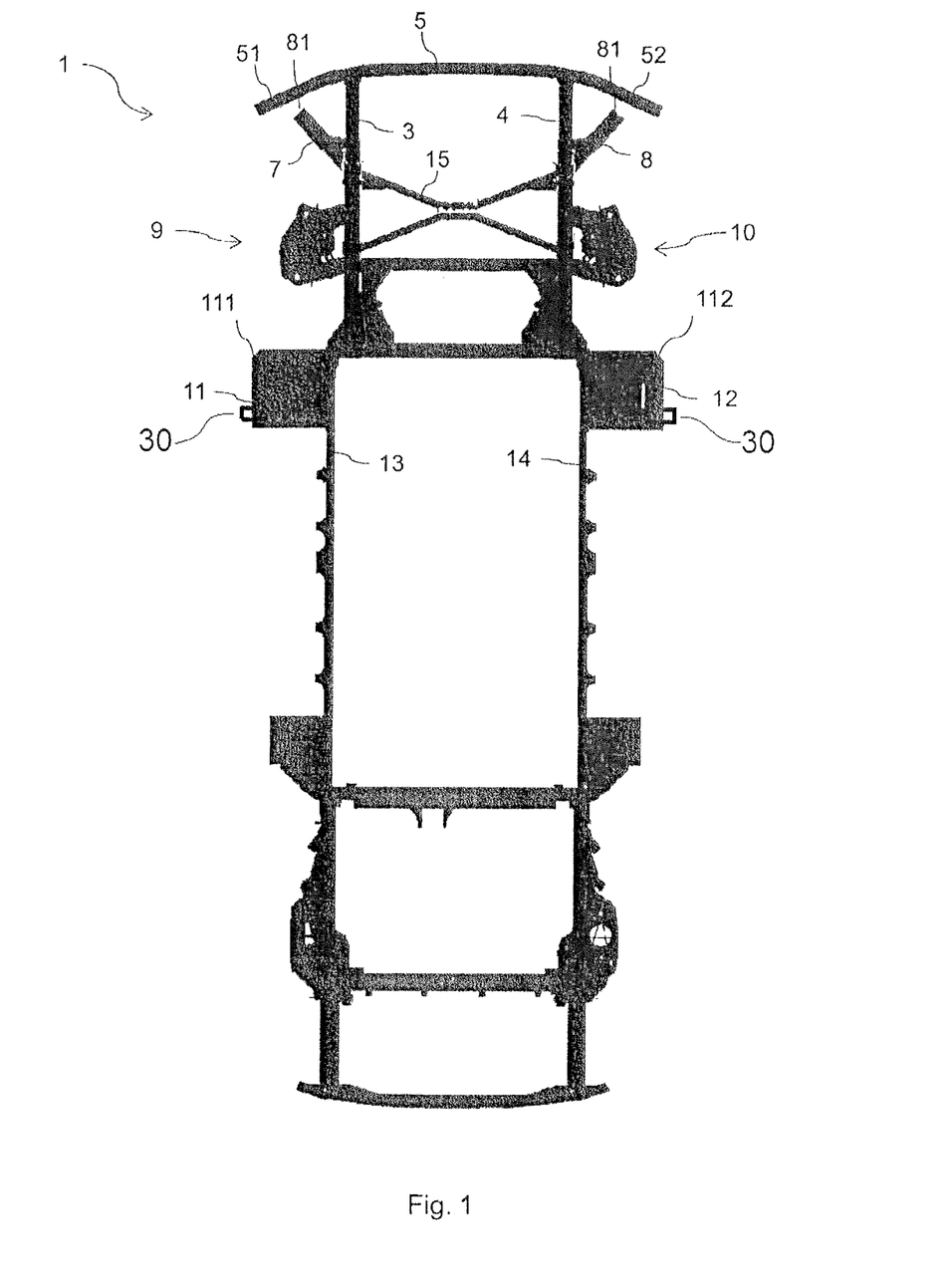
FIG. 1 shows a schematic top view onto a lower body frame of a motor vehicle body according to a first exemplary embodiment of the present invention.

FIG. 1 shows a top view onto a lower frame of a motor vehicle body 1. According to the first exemplary embodiment, the lower frame of the motor vehicle body 1 is substantially made of aluminum. The motor vehicle body 1 has a front left longitudinal beam 3 and a front right longitudinal beam 4. A bumper cross member 5 is disposed at the ends of the left longitudinal beam 3 and the right longitudinal beam 4. A left end section 51 of the bumper cross member 5 projects beyond the front left longitudinal beam 3, and a right end section 52 of the bumper cross member 5 projects beyond the front right longitudinal beam 4. A cantilever beam 7 is fixed to the front left longitudinal beam 3 in a torsion-proof manner. Likewise, a right cantilever beam 8 is fixed to the front right longitudinal beam 4 in a torsion-proof manner. The left cantilever beam 7 is disposed in a space between a left wheel mount 9 and the left end section 51 of the bumper cross member 5. Likewise, the right cantilever beam 8 is disposed between a right wheel mount 10 and the right end section 52 of the bumper cross member 5. A support beam 11 is located behind the wheel mount 9 in the longitudinal direction, which is to say the wheel mount 9 is disposed between the support beam 11 and the cantilever beam 7. In the event of a frontal collision with small overlap, the support beam 11 is intended to absorb a load of a left wheel, which is not shown. The support beam 11 furthermore has a chamfered sliding surface 111, which is designed and disposed in such a way that it favors sliding of the left wheel off toward an outward direction in the event of a frontal collision with small overlap. Analogously, a support beam 12 having a chamfered sliding surface 112 is formed on the right side of the motor vehicle body 1, the support beam being located behind the wheel mount 10 in the driving direction.

The support beam 11 is fixed to a left central longitudinal beam 13, which is disposed with slight offset in relation to the front left longitudinal beam 3. Likewise, the support beam 12 is disposed on a right central longitudinal beam 14, which is provided with slight offset in relation to the front right longitudinal beam 4.

The support beams 11 and 12 are, moreover, provided in each case with the function of a car jack receiving element 30.

FIG. 1 additionally shows a brace 15 in the manner of a half-timbering design, which is disposed and fixed between the front left longitudinal beam 3 and the front right longitudinal beam 4. The left cantilever beam is additionally supported on the front right longitudinal beam via the brace structure 15. Additionally, the right cantilever beam 8 is also supported on the front left longitudinal beam 3 via the brace 15.

A function of the motor vehicle body during a frontal collision with small overlap will be described hereafter with reference to FIGS. 2 and 3.

Figure 2:
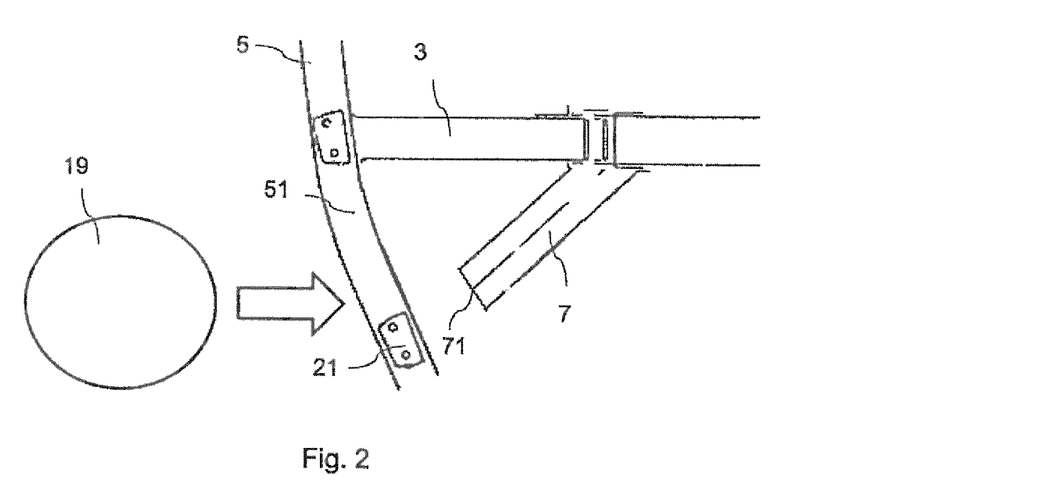
FIG. 2 is a schematic top view onto an end section of a bumper cross member, a longitudinal beam and a cantilever beam of the motor vehicle body according to the first exemplary embodiment of the present invention before a frontal collision.

FIG. 2 shows a front section of the front left longitudinal beam 3, the cantilever beam 7 fixed thereto in a torsion-proof manner, and the left end section 51 of the bumper cross member 5, wherein the bumper cross member 5 is fixed in a torsion-proof manner to the front end of the longitudinal beam 3. An obstacle 19 is shown schematically as a collision partner in FIG. 2.

During the frontal collision with small overlap, the motor vehicle or the motor vehicle body impacts the obstacle 19 with offset. In particular, the center of the obstacle 19 is located outside the longitudinal beam 3.

Figure 3:
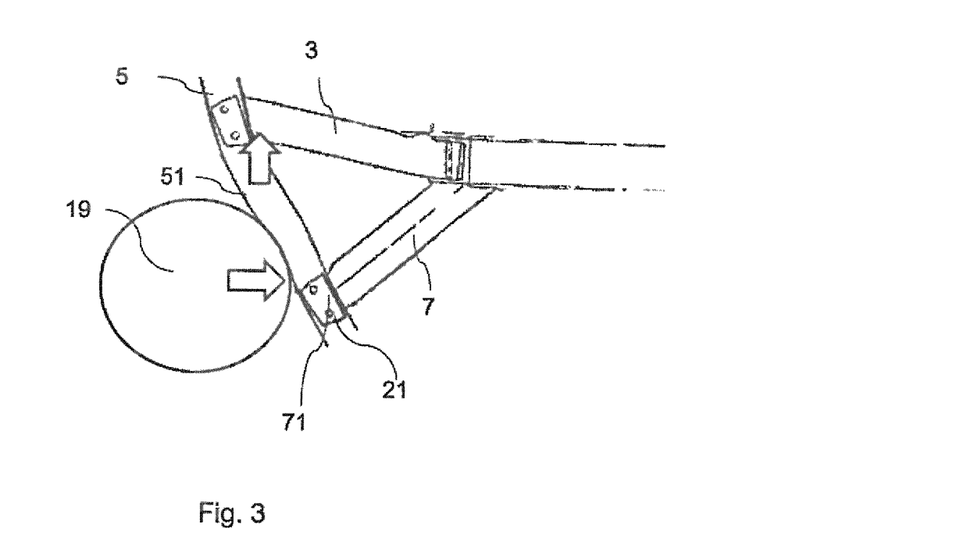
FIG. 3 is a schematic top view onto the end section of a bumper cross member, the longitudinal beam and the cantilever beam of the motor vehicle body according to the first exemplary embodiment of the present invention during the frontal collision.

As is shown in FIG. 3, the end section 51 of the bumper cross member 5 is bent backward by the obstacle 19 during the collision with small overlap, specifically until the end section 51 of the bumper cross member 5 impacts the end face 71 of the left cantilever beam 7. The strength of the cantilever beam 7 and the support of the cantilever beam 7 on the longitudinal beam 3 is designed such that transverse forces occur, which push or move the collision partners, which in the present example are the motor vehicle and the obstacle 19, away from each other, as is illustrated in particular also by an arrow in FIG. 3. In this way, frontal collision energy can be reduced, insofar as the collision partners are pushed away from each other and the corresponding collision energy no longer has to be absorbed by the motor vehicle body.

As was already described above, a collision partner can be a fixed obstacle or another, oncoming vehicle, which collides with this vehicle or the motor vehicle body with small overlap.

In the further course of the collision, the collision partner impacts the left wheel, which is not shown in FIGS. 2 and 3, and pushes the same against the support element 11, as shown in FIG. 1. During a normal course of the frontal collision with small overlap, the wheel further impacts the chamfered sliding surface 111 of the support beam 11. The chamfered sliding surface causes the wheel to slide off along the chamfered sliding surface 111, and therefore in the transverse direction of the motor vehicle body 1. This favors a movement of the wheel in the outward direction.

According to the first exemplary embodiment, the cantilever beam and the support beam therefore advantageously act in such a way that frontal collision forces are laterally deflected.

Figure 4:
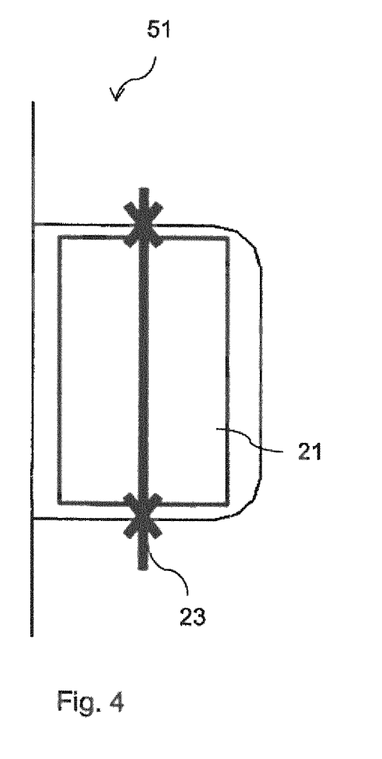
FIG. 4 is a schematic sectional view through the end section of the bumper cross member according to the first exemplary embodiment.

FIG. 4 shows a sectional view of the end section 51 of the bumper cross member 5. The end section 51, and preferably the entire bumper cross member 5, is designed as a closed hollow profile element. The closed hollow profile element can be integrally designed or be composed of a U-shaped profile section and a plate element fixed thereto. A profile reinforcement 21 is disposed in a chamber of the hollow profile element. The profile reinforcement 21 substantially takes up the entire hollow profile element cross-section, but alternatively may also take up only parts thereof. The profile reinforcement 21 according to the present first exemplary embodiment takes up the portion of the hollow profile element of the end section 51 of the bumper cross member 5 which impacts the end face 71 of the cantilever beam 7 in the event of a collision with small overlap. The profile reinforcement 21 is approximately as wide in the direction of the width of the motor vehicle as the end face 71 of the cantilever beam 7.

The profile reinforcement 21 prevents the end section 51 of the bumper cross member 5, which during the collision impacts the end face 71 of the cantilever beam 7, from being compressed. In this way, bending of the end section 51 of the bumper cross member 5 by the collision partner is also advantageously limited. A yield point of the material of the end section 51 of the bumper cross member is therefore not reached until a later point in time, or not at all.

Figure 5:
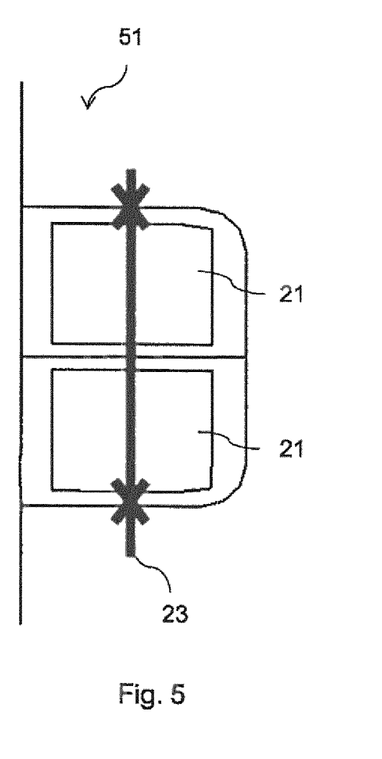
FIG. 5 is a schematic sectional view through the end section of the bumper cross member according to one variant of the first exemplary embodiment.

FIG. 5 illustrates an alternative to the hollow profile element shown in FIG. 4. In particular, the alternative hollow profile element is designed with two chambers, while the hollow profile element shown in FIG. 4 has only one chamber. A profile reinforcement 21 is disposed in each chamber of the alternative hollow profile element.

Figure 6:
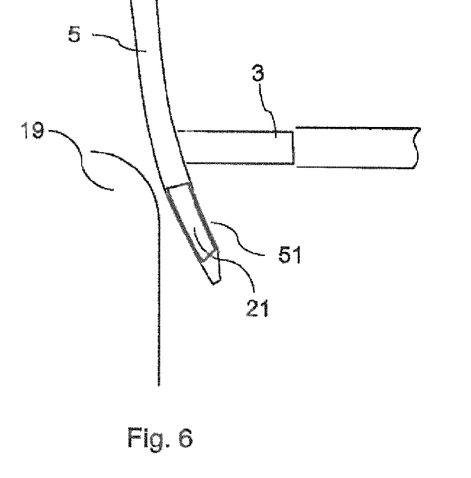
FIG. 6 is a schematic top view onto an end section of a bumper cross member and a longitudinal beam of a motor vehicle body according to a second exemplary embodiment of the present invention before a frontal collision.
Figure 7:
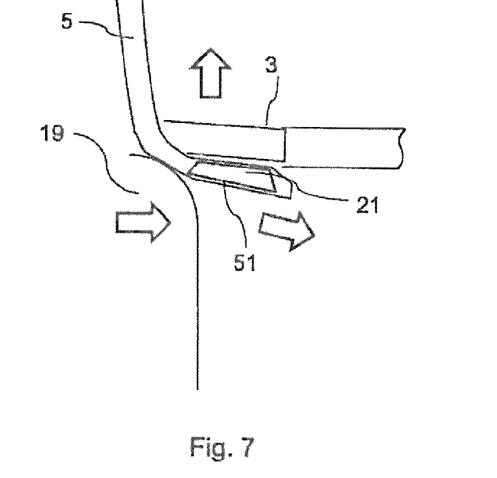
FIG. 7 is a schematic top view onto the end section of the bumper cross member and the longitudinal beam of the motor vehicle body according to the second exemplary embodiment of the present invention during the frontal collision.

A detailed description of a second exemplary embodiment of the present invention is provided hereafter with reference to FIGS. 6 and 7. In particular, the differences compared to the first exemplary embodiment are described.

A motor vehicle body according to the second exemplary embodiment has a longitudinal beam 3 and a bumper cross member 5; however, contrary to the motor vehicle body according to the first exemplary embodiment, it does not have a cantilever beam. FIG. 6 shows a schematic top view onto a left end section 51 of the bumper cross member 5 and the left longitudinal beam 3 before a frontal collision, which is to say in a non-collided and deformed state. A profile reinforcement 21 is provided in the end section 51.

An action of the invention in the second exemplary embodiment will be shown with reference to FIG. 7. As a result of a frontal collision with small overlap with a collision partner 19, the end section 51 of the bumper cross member 5 is bent in the region of the left longitudinal beam 3 until the profile reinforcement 21 of the end section 51 makes contact with an outer lateral wall of the longitudinal beam 3. A cross-section of the end section 51, however, is maintained. The end section 51 is not compressed due to the presence of the profile reinforcement 21. A transverse force in accordance with the upwardly directed arrow shown in FIG. 7 is therefore generated, which causes the motor vehicle to be pushed away laterally. Due the lateral pushing motion, the overlap between the motor vehicle and the collision partner 19 is reduced, and a collision effect on the motor vehicle is decreased.

Depending on the body and position of the longitudinal beams, a cantilever beam as it is described with respect to the first exemplary embodiment is therefore not absolutely necessary for the profile reinforcement 21 to advantageously cause the generation of a transverse force or of a transverse momentum during the frontal collision with small overlap, so as to reduce an overlap with the collision partner.

Figure 8:
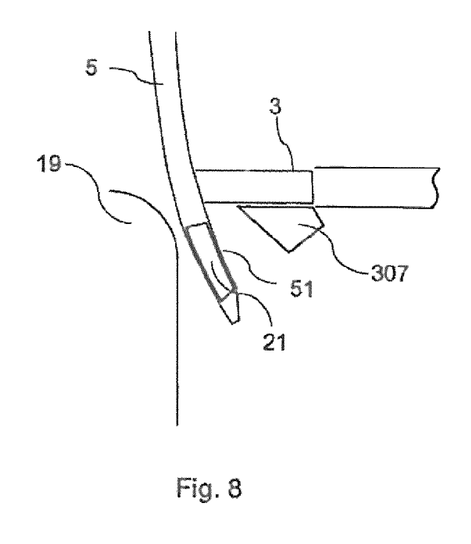
FIG. 8 is a schematic top view onto an end section of a bumper cross member, a longitudinal beam and a support element of a motor vehicle body according to a third exemplary embodiment of the present invention before a frontal collision.
Figure 9:
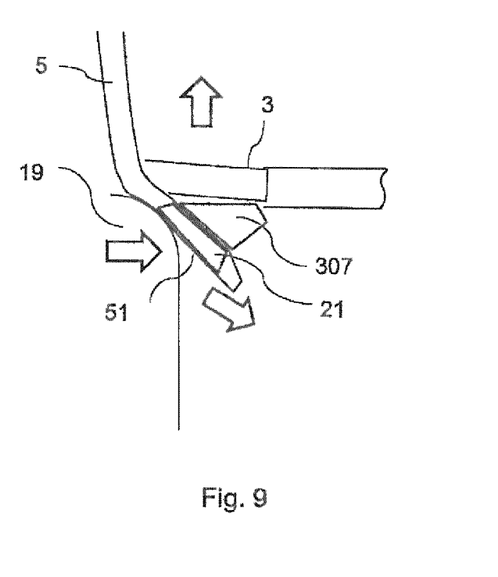
FIG. 9 is a schematic top view onto the end section of the bumper cross member, the longitudinal beam and the support element of the motor vehicle body according to the third exemplary embodiment of the present invention during the frontal collision.

A detailed description of a third exemplary embodiment of the present invention is provided hereafter with reference to FIGS. 8 and 9. In particular, the differences compared to the first and second exemplary embodiments are described.

A motor vehicle body according to the third exemplary embodiment includes a longitudinal beam 3 and a bumper cross member 5; however, contrary to the motor vehicle body according to the first exemplary embodiment, it does not have an obliquely forwardly extending cantilever beam. Instead of the cantilever beam according to the first exemplary embodiment, a support element 307 is provided on a lateral wall of the longitudinal beam 3.

FIG. 8 shows a schematic top view onto a left end section 51 of the bumper cross member 5, the left longitudinal beam 3 and a support element 307 provided thereon before a frontal collision, which is to say in a non-collided and deformed state. Analogously to the first exemplary embodiment and the second exemplary embodiment, a profile reinforcement 21 is provided in the end section 51. The profile reinforcement 21 is, in particular, provided in the region of the end section 51 which will impact the support element 307 during a frontal collision with small overlap.

An action of the invention in the third exemplary embodiment will be shown with reference to FIG. 9. As a result of a frontal collision with small overlap with a collision partner 19, the end section 51 of the bumper cross member 5 is bent in the region of the left longitudinal beam 3 until the profile reinforcement 21 of the end section 51 makes contact with the support element 307. A cross-section of the end section 51, however, is maintained. The end section 51 is not compressed due to the presence of the profile reinforcement 21. A transverse force in accordance with the upwardly directed arrow shown in FIG. 9 is therefore generated, which causes the motor vehicle to be pushed away laterally. Due the lateral pushing motion, the overlap between the motor vehicle and the collision partner 19 is reduced, and a collision effect on the motor vehicle or on the motor vehicle body is decreased.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle body, comprising:
   a longitudinal beam;
   a bumper cross member, which is fixed to one end of the longitudinal beam, wherein an end section of the bumper cross member configured as a closed or open hollow profile element protrudes over the longitudinal beam in a transverse direction;
   a cantilever beam disposed directly on the longitudinal beam, the cantilever beam extending obliquely forward from the longitudinal beam into a space between a wheel mount and the end section of the bumper cross member, and
   a collision-resistant profile reinforcement provided at least in some regions in the hollow profile element in the end section of the bumper cross member, wherein
   the cantilever beam and the end section of the bumper cross member are disposed so as to cooperate with each other such that in a frontal collision with small overlap the end section of the bumper cross member bends to impact the cantilever beam in a region where the profile reinforcement is located in the end section, and
   the profile reinforcement is configured to withstand the frontal collision with small overlap up to a predetermined collision energy such that the bumper cross member in the region where the profile reinforcement is located and cooperates with the cantilever beam is essentially not compressed to cause a transverse momentum on the motor vehicle body that reduces an overlap of collision partners in the frontal collision with small overlap thereby reducing collision energy that has to be absorbed by the motor vehicle body.

2. The motor vehicle body according to claim 1, wherein the end section of the bumper cross member, which is deformed as a result of the frontal collision, impacts the cantilever beam at an end face thereof and is supported at the end face so that further deformation of the end section of the bumper cross member is prevented.

3. The motor vehicle body according to claim 1, wherein the profile reinforcement is provided only in the region of the end section of the bumper cross member that impacts the longitudinal beam in the frontal collision with small overlap.

4. The motor vehicle body according to claim 1, wherein the cantilever beam, the longitudinal beam, and the bumper cross member are located substantially in one plane.

5. The motor vehicle body according to claim 4, wherein the one plane is parallel to a longitudinal axis and a transverse axis of the motor vehicle body.

6. The motor vehicle body according to claim 1, wherein one or both of the longitudinal beam or the bumper cross member are made of aluminum.

7. The motor vehicle body according to claim 1, further comprising:
- a support beam provided on a side of a wheel mount facing away from the end section of the bumper cross member, wherein
- the support beam is configured such that a load of the frontal collision transmitted via a wheel is absorbable by the support beam.

8. The motor vehicle body according to claim 7, wherein the support beam is further configured so as to support a movement of the wheel in the transverse direction during the frontal collision.

9. The motor vehicle body according to claim 8, wherein the support beam has a chamfered sliding surface configured such that the wheel is moved in an outward direction relative to the vehicle.

10. The motor vehicle body according to claim 7, wherein the support beam is fixed to the longitudinal beam or to another longitudinal beam.

11. The motor vehicle body according to claim 10, further comprising:
- a car jack receiving element provided on the support beam.

12. The motor vehicle body according to claim 1, wherein the profile reinforcement is made of a plastic material.

13. The motor vehicle body according to claim 12, wherein the plastic material is a foamed plastic material.

14. The motor vehicle body according to claim 1, wherein the profile reinforcement is made of a metal extruded profile element, an extrusion direction forming a main load direction of the frontal collision with small overlap.

* * * * *